United States Patent Office 3,225,114
Patented Dec. 21, 1965

3,225,114
METHOD OF IMPROVING YOUNG'S MODULUS OF POLYAMIDE BY CONDENSATION IN PRESENCE OF POLYCARBONATE
Richard D. Chapman, Durham, N.C., assignor to Monsanto Company, a corporation of Delaware
No Drawing. Filed July 21, 1964, Ser. No. 384,237
6 Claims. (Cl. 260—857)

This invention relates to fiber forming synthetic linear polycarbonamides, fibers obtained therefrom, and improvements therein. More particularly, this invention relates to polyamides and yarns made therefrom which have an improved modulus of elasticity (Young's modulus).

The polymeric substances with which this invention are concerned are synthetic, linear, high-molecular weight fiber forming polycarbonamides of the general type, characterized by the presence of recurring carbonamide groups as an integral part of the polymer chain, and wherein such groups are separated by at least two carbon atoms. They are further characterized by high melting point, pronounced crystallinity, and insolubility in most solvents except mineral acids, formic acid and the phenols. Upon hydrolysis with strong mineral acids the polymers revert to the reactants from which they were formed.

The simple polyamides of this type are usually made by heating substantially equal molecular proportions of a diamine with a dicarboxylic acid until the product has polymerized to the fiber forming stage, which stage is not generally reached until the polyamide has a relative viscosity of at least 7. The polymers thus obtained have high melting points and can be cold drawn to form strong, highly oriented fibers. In the description of this invention the relative viscosity measurements were taken and determinations made in the conventional manner, i.e., by employing an Ostwald viscometer at 25° C. A solution of the polyamide whose relative viscosity is to be determined is prepared in 90 percent formic acid having a concentration of 11 grams per 100 cc. solvent. The time required for a given volume of this solution to pass through the viscometer divided by the time required to pass an equal volume of the solvent through the viscometer is taken as the relative viscosity of the polymer.

The diamines and dicarboxylic acids and amide forming derivatives thereof which can be used as reactants to yield the simple fiber-forming polyamides are well known to the art. Suitable diamines may be represented by the general formula $NH_2(CH_2)_nNH_2$ in which $n$ is an integer of 2 or greater. Representative examples are ethylene diamine, propylene diamine, tetramethylene diamine, pentamethylene diamine, hexamethylene diamine, octamethylene diamine, decamethylene diamine, etc. Suitable dicarboxylic acid reactants are represented by the general formula HOOCRCOOH in which R is a divalent hydrogen radical having a chain length of at least two carbon atoms. These dicarboxylic acids are illustrated by sebacic acid, octadecanedioic acid, adipic acid, suberic acid, azelaic acid, undecanedioic acid, glutaric acid, pimelic acid, brassylic acid, tetradecanedioic acid, etc.

In place of the above-noted dicarboxylic acids and diamines the amide forming derivatives thereof can be employed to form fiber-forming polymers. Amide forming derivatives of the diamines include the carbamates and N-formyl derivative. Amide forming derivatives of the dibasic carboxylic acids comprise the mono- and di-ester, the anhydride, the mono- and di-amide, and the acid halide.

In addition to the above diamines and dicarboxylic acids and their derivatives the polyamides of this invention may be prepared from certain of the amino acids. These amino acids are represented by the general formula $H_2N(CH_2)_nCOOH$ in which $n$ is an integer of 4 or more. Illustrative examples of these amino acids are 6-aminocaproic acid, 7-aminoheptanoic acid, 8-aminooctanoic acid, 9-aminononanoic acid, 10-aminodecanoic acid, 11-aminoundecanoic acid, 12-aminododecanoic acid, 13-aminotridecanoic acid, etc. Also the lactams of these amino acids can be used as monomers from which the polyamides of the present invention can be prepared.

Of the many presently known polycarbonamide compositions probably the most widely known, because of their commercial importance, are the homopolymers prepared from the reaction of hexamethylene diamine and adipic acid (nylon 66), and the polymer obtained from the self-polymerization of caprolactam (nylon 6). Although these previously known polycarbonamides have much to commend them, and some have achieved eminent commercial success, there is still need for new and improved properties.

It is known that fibers produced from these prior known polyamides have a tendency to stretch when exposed to tensile stresses. The amount of strain resulting from any given stress up to the elastic limit is related to the modulus of elasticity or Young's modulus. The greater the modulus of elasticity the less the resulting strain will be for a given stress. It would therefore be desirable to produce a polyamide and fibers therefrom having an increased modulus of elasticity otherwise known as Young's modulus. A new fiber having such improved properties would find wide acceptance and use in such articles of commerce, as rope and bristles.

Accordingly, it is a principal object of this invention to prepare synthetic linear polycarbonamides and fibers therefrom having an increased modulus of elasticity or Young's modulus.

It is another object of this invention to prepare synthetic linear polycarbonamides and fibers therefrom which possess a greater range of elastic properties than other polyamides heretofore known.

These and other objects and advantages will become apparent in the course of the following detailed description of the invention and claims.

In general, these objects are accomplished in accordance with this invention, by adding a polycarbonate having a molecular weight in excess of 5000 to the polyamide forming reactants in an amount of from about 1.5 to 20 percent based on the weight of the polyamide, preferably from 2 to 10 percent; the introduction being made prior to the point where the reaction mass has attained a relative viscosity of 20. It has been found that later additions result in an increase in viscosity and an increase to such an extent that it becomes very difficult to spin the polymer into fibers, filaments, bristles, films and the like. The additive agent may be introduced into the polymerization cycle at any point prior to the point where the reaction mass has reached a relative viscosity of 20, the additive may be added to the polyamide forming reactants or the polyamide forming salt while in solution before evaporation, during evaporation, after evaporation, or during polymerization prior to the attainment of a relative viscosity of 20.

As might be expected, the higher concentration of additive and the greater molecular weights thereof have correspondingly greater influence upon the modulus of elasticity. For most purposes the best results can be obtained by employing a polycarbonate with a molecular weight in the range of from 10,000 to 80,000 in an amount of from about 2 to 10 percent based on the weight of the polyamide to be formed.

As is well known polycarbonates are linear polyesters of carbonic acid. Since the methods by which they are prepared are well understood in the art it will merely be stated that they are prepared by the reaction of carbonic acid derivatives with dihydroxy compounds. Among suitable carbonic acid derivatives which may be employed are aliphatic diesters, such as diethyl-, dipropyl,- dibutyl-, diamyl-, dioctyl-, methylethyl-, ethylpropyl; cycloaliphatic diesters such as dicyclohexyl- and dicyclopentyl-carbonate; diaryl esters such as diphenyl; and ditolylcarbonate; and others, such as methylcyclohexyl-, ethylcyclohexyl-, methylphenyl-, ethylphenyl-, and cyclohexylphenyl-carbonate.

Among aliphatic dihydroxy compounds which may be employed as reactants in forming polycarbonates there may be mentioned diethylene glycol, triethylene glycol, polyethylene glycol, and di-glycols produced from propylene oxide-1,2, butane diol-1,4, hexane diol-1,6, octane diol-1,8, decane diol-1,10. Suitable cycloaliphatic dihydroxy compounds are cyclohexane diol-1,4; 2,2-di(p-hydroxycyclohexyl)propane and 2,6 - dihydroxy - decahydronapthalene. Suitable aromatic dihydroxy compounds are hydroquinone, resorcinol, 4,4-dihydroxydiphenyl, 1,4 - dihydroxynapthalene, 1,6 - dihydroxynapthalene, 2,6-dihydroxynapthalene, 1,5-dihydroxyanthracene and m,p-hydroxybenzyl alcohol. Mixtures of these dihydroxy compounds may also be employed.

Any of the above reactants may be employed in preparing polycarbonates suitable for the purposes of this invention, in as much as the general class of these polymers may be used to advantage without restriction, save that of molecular weight, which should be in excess of 5,000.

The modified synthetic linear polycarbonamides of this invention are prepared by processes well known in the art and commonly employed in the manufacture of simple polyamides. That is, the reactants are heated at a temperature of from 180° C. to 300° C. and preferably from 200° C. to 295° C. until the product has sufficiently high molecular weight to exhibit fiber forming properties. This condition is reached when the polyamide has reached a relative viscosity of at least about 7. The reaction can be conducted at superatmospheric, atmospheric, or subatmospheric pressure. Often it is desirable especially in the last stage in the reaction, to employ conditions, e.g., reduced pressure, which will aid in the removal of the reaction by-product. Preferably the reaction is carried out in the absence of oxygen, e.g., in an atmosphere of nitrogen. When diamine and dicarboxylic acid are used as polyamide forming composition they are normally introduced into the autoclave as a preformed salt, but may be in the form of uncombined diamine and dicarboxylic acid when added to the autoclave.

The synthetic linear polycarbonamides as described herein may be prepared, spun, and drawn under conventional polyamide forming production conditions. In addition, to the afore-described reactants, delustrants, antioxidants, plasticizers, viscosity stabilizers, chain terminators, and other like modifying agents may be used in the preparation of the polyamides of the invention.

The novel polyamides of the present invention are of primary interest for use in the manufacture of filaments, yarns, and fabrics. They are, however, equally useful in other end products such as films, bristles and the like.

In order to illustrate the invention and advantages thereof with greater particularity, the following specific examples are given. It should be understood that they are intended to only be illustrative and not limitative. Parts and percentages are given by weight unless otherwise indicated.

*Example I*

This example illustrates the preparation of filaments from a conventional fiber forming polyamide (polyhexamethyleneadipimide, nylon 66) and will be used as a standard of comparison with the improved polyamides of this invention.

A solution of 147 parts of hexamethylene diammonium adipate (nylon 66 salt) dissolved in 153 parts of water was added to a stainless steel evaporator which had previously been purged of air with purified nitrogen. This evaporator was positioned immediately above an autoclave and equipped with means for dropping the contents thereof into the autoclave when desired. The solution was then heated under a nitrogen blanket at a pressure of 13 p.s.i.g. with the continuous removal of steam condensate until the salt solution reached a temperature of 137° C. and sufficient evaporation had occurred to provide a solution having 75 percent concentration of nylon salt. At this point, the salt solution was charged to the stainless steel autoclave. The autoclave had been previously purged of air by the use of purified nitrogen. The temperature and pressure were slowly raised until values of 220° C. and 250 p.s.i.g., respectively were reached, after which the temperature was further increased to 243° C. while the pressure was maintained at 250 p.s.i.g. by removal of steam as condensate. Also during this period the mixture was continuously agitated by means of a wall scrapping blade contained within the autoclave. At this point the pressure reduction cycle began. The pressure was gradually reduced to atmospheric over a 25 minute period and the polymer melt was allowed to equilibrate for 30 minutes at 278° C. Upon completion of the reaction the finished polymer having a relative viscosity value of 44.5 was extruded directly from the autoclave through a single hole spinneret yielding a mono-filament fiber. Upon being drawn at a draw ratio of 5.2:1 this fiber of 10.7 denier exhibited a tenacity of 8.7 grams per denier and an elongation of 21 percent.

*Example II*

This and the following examples illustrate the preparation of filaments from a fiber forming polycarbonamide modified in accordance with this invention, i.e. polyhexamethylene adipamide modified with a small amount of polycarbonate.

A solution of 147 parts of hexamethylene diammonium adipate dissolved in 153 parts of water was added to a stainless steel evaporator which had previously been purged of air with the use of purified nitrogen. The evaporator was positioned above a stainless steel high-pressure autoclave and equipped with means for dropping the contents thereof into the autoclave when desired. This solution was then heated under a nitrogen blanket at a pressure of 13 p.s.i.g. with the continuous removal of steam condensate until the salt solution reached a temperature of 137° C. and a concentration of nylon salt of about 75 percent. At this point the salt solution was charged to the nitrogen purger stainless steel high-pressure autoclave into which had previously been placed 2.0 weight percent (based on the weight of the polymer) of 2,2-bis(4-hydroxyphenyl)propane polycarbonate having a molecular weight of about 30,000. The temperature and pressure were slowly raised until values of 220° C. and 250 p.s.i.g. respectively, were reached; after which the temperature was further increased to 243° C. while the pressure was maintained at 250 p.s.i.g. by the continuous removal of steam as condensate. Also during this period the mixture was continuously agitated by means of a wall scrapping blade contained within the autoclave. At this point the pressure reduction cycle began. The pressure was gradually reduced to atmospheric during a 25 minute period and the polymer melt was allowed to equilibrate for 30 minutes at 278° C. This finished polymer had a relative viscosity of 43.4. The final molten polymer was melt spun directly from the autoclave through a single hole spinneret yielding a mono-filament fiber. This fiber which was subsequently drawn 5.4 times its original length to a denier of 10.2 exhibited a measured tenacity of 9.9 grams per denier and an elongation of approximately 20 percent.

Example III

A batch of polymer was prepared following the technique and procedures set forth in Example II with the exception that 5 percent based on the weight of the polymer 2,2-bis(4-hydroxyphenyl)propane polycarbonate was placed in the autoclave in lieu of 2 percent as in Example II.

The finished polymer thus obtained had a relative viscosity of 32.0. This finished molten polymer was spun directly from the autoclave through a 14 hole spinneret yielding a white multi-filament yarn. This yarn was subsequently drawn at a ratio of 5.75:1 and had a measured elongation of 20 percent, a tenacity of 8.4 grams per denier, and a denier of 91.8.

Example IV

A batch of polymer was prepared in a manner identical to that employed in Example III except that 7 percent based on the weight of the polymer of polycarbonate was used. The finished polymer thus obtained had a relative viscosity of 35.2.

The final molten polymer was spun directly from the autoclave through a 14 hole spinneret yielding white multi-filament yarn. Upon being drawn to a ratio 5.5:1 the yarn had a denier of aproximately 79.8, a tenacity of 8.7 grams per denier and an elongation of 23 percent.

Example V

Polymer was prepared by employing procedures and techniques identical to those used in Example III except that 10 percent based on the weight of the final polymer obtained of the polycarbonate was used. The relative viscosity of the finished polymer so obtained was 31.7.

The final molten polymer was spun directly from the autoclave through a 14 hole spinneret to yield a white multi-filament yarn. This yarn was drawn 5.90 times its original length to a measured tenacity of 10.1 grams per denier at a denier of 85.7 and an elongation of 20 precent.

Example VI

An aqueous solution containing 50 percent by weight of hexamethylene diammonium adipate was added to a stainless steel evaporator which had previously been purged of air with the use of purified nitrogen, and which was positioned immediately above a stainless steel high-pressure autoclave and equiped for dropping the contents thereof into the autoclave when desired. This solution was slowly heated under a nitrogen blanket at a pressure of 13 p.s.i.g. with the continuous removal of steam condensate until the salt solution reached a temperature of 137° C. and sufficient evaporation had occurred to provide a solution having 75 percent concentration of the nylon salt. At this point the solution was charged to the stainless steel high pressure autoclave, which had been nitrogen purged, and into which had previously been placed 7.5 weight percent of 2,2-bis(4-hydroxyphenyl)propane polycarbonate having a molecular weight of about 30,000.

The temperature and pressure were slowly raised until values of 220° C. and 250 p.s.i.g., respectively, were reached; after which the temperature was further increased to 243° C. while the pressure was maintained at 250 p.s.i.g. by the continuous removal of steam as condensate. Also during this period the mixture was continuously agitated by means of wall scrapping blade contained within the autoclave. At this point the pressure reduction cycle began. The pressure was gradually reduced to atmospheric over a 90 minute period and the polymer melt was allowed to equilibrate for 30 minutes at 278° C. The finished polymer having a relative viscosity of 35.3 was cast as a continuous ribbon by extrusion through an orifice in the autoclave, cooled and cut into course flake-like particles. This polymer flake was then melt spun through a 140 hole spinneret yielding white multi-filament yarn. This yarn was drawn at a draw ratio of 5.89:1 and exhibited a final tenacity of 9.29 grams per denier, an elongation of 19.2 percent, and a denier of 886.

In order to demonstrate the practical usefulness of the improved polyamides of the present invention comparative tests of the fibers of the above examples were conducted and calculations made to determine the modulus of elestacity or Young's modulus of these fibers. The testing was done and measurements taken on an Instron tensile tester. The results are tabulated in the following table:

| Example: | Young's modulus (dynes/sq. cm.) |
|---|---|
| I (control) | $7.3 \times 10^{10}$ |
| II | $7.8 \times 10^{10}$ |
| III | $9.6 \times 10^{10}$ |
| IV | $8.9 \times 10^{10}$ |
| V | $10.7 \times 10^{10}$ |
| VI | $9.3 \times 10^{10}$ |

It is clearly seen from the results in the above table that the value found for Young's modulus was substantially increased over the control (Example I, nylon 66 prepared by standard method) in all instances. In one instance (Example V) the value obtained for Young's modulus represents a 46.6 percent improvement over that of commercial nylon 66 (Example I).

Additionally, it can be noted from the data of the above examples that the other physical properties (other than the modulus of elasticity) of these polymers and fibers are not degraded as is so often the case in addition of additives to the standard polyamide systems. That is to say, that the desirable physical properties such as tenacity, elongation, and relative viscosity of these modified polyamides and fibers produced therefrom have been maintained at the same desirable levels as those exhibited by the standard commercially successful polyamides (nylon 66 and nylon 6).

As previously noted the products obtained in the practice of this invention are particularly useful in the manufacture of rope and bristles, where polyamides having a high value of Young's modulus are especially desired. A rope produced from fibers having a high modulus of elasticity would stretch less under low loads than one produced from fibers having a low modulus. However, they may also be used to advantage in the manufacture of fibers, films, and the like where the ultimate end-use intended would be benefitted by the employment of a polymer having an increased modulus of elasticity.

As many different embodiments would readily occur to those skilled in polymer chemistry it is to be understood that the specific embodiments of the invention as presented herein are not to be construed as limiting, but that the limitations are to be determined only from the appended claims.

Having thus described my invention in detail what I claim as new and desire to secure by U.S. Letters Patent is:

1. A process for increasing the modulus of elasticity of fiber-forming synthetic linear polycarbonamides which comprises subjecting polyamide-forming reactants which are capable of forming polyamides having recurring carbonamide groups as an integral part of the polymer chain, which groups are separated by at least two carbon atoms, to a condensation reaction by heat treatment at a temperature in the range of from 180° C. to 300° C.; thereafter reacting the reaction mass at a point before said reaction mass has reached a relative viscosity of 20 with a polycarbonate having a molecular weight in excess of 5,000 and in an amount of from 1.5 to 20 percent based on the weight of the polyamide to be formed.

2. The process of claim 1 wherein said polycarbonate is 2,2-bis(4-hydroxyphenyl)propane polycarbonate.

3. The process of claim 1 wherein said polyamide-forming reactant is hexamethylene diammonium adipate.

4. The product obtained by the process of claim 1.

5. A textile fiber comprising the product obtained by the process of claim 1.

6. A process for increasing the modulus of elasticity of fiber-forming synthetic linear polyamides which comprises subjecting polyamide-forming reactants which are capable of forming polyamides having recurring carbonamide groups as an integral part of the polymer chain, which groups are separated by at least two carbon atoms, to a condensation reaction by heat treatment at a temperature in the range of from 180° C. to 300° C.; thereafter reacting the reaction mass at a point before said mass has reached a relative viscosity of 20 with a polycarbonate having a molecular weight of from 10,000 to 80,000 and in an amount of from 2 to 10 percent based on the weight of the polyamide to be formed.

References Cited by the Examiner

UNITED STATES PATENTS

| 2,789,970 | 4/1957 | Reynolds et al. | 260—857 |
| 2,789,971 | 4/1957 | Reynolds et al. | 260—857 |
| 2,843,567 | 7/1958 | Williams et al. | 260—463 |

MURRAY TILLMAN, *Primary Examiner.*